United States Patent
Ford

[11] Patent Number: 5,874,893
[45] Date of Patent: Feb. 23, 1999

[54] RELAY ACTIVATED DEVICE FOR PREVENTING SMOKING IN A VEHICLE

[76] Inventor: Edward H. Ford, 111 Burkhart Dr., Natchez, Miss. 39120

[21] Appl. No.: 959,481

[22] Filed: Oct. 30, 1997

[51] Int. Cl.$^6$ .............................. B60Q 1/00; G08B 23/00
[52] U.S. Cl. ......................... 340/460; 340/460; 340/573; 340/679; 340/457
[58] Field of Search .................................... 340/460, 692, 340/425.5, 457, 531, 573; 381/59, 86

[56] References Cited

U.S. PATENT DOCUMENTS

| | | | |
|---|---|---|---|
| 4,346,364 | 8/1982 | Takagi et al. | 340/692 |
| 4,389,639 | 6/1983 | Torii et al. | 340/692 |
| 4,733,675 | 3/1988 | Destro | 340/328 |
| 5,190,307 | 3/1993 | Brown et al. | 340/576 |

Primary Examiner—Donnie L. Crosland

[57] ABSTRACT

A vehicular anti-smoking system is provided including at least one speaker connected to a conventional stereo system of a vehicle. The speaker is adapted to transmit audio signals upon the receipt thereof. Further provided is at least one relay having a first input connected to the stereo system, a second input, and an output connected to the speaker. The relay has an normal first mode wherein the speakers are connected to the stereo system via the first input and a second mode only during the receipt of an activation signal wherein the speaker is connected to the second input. A control mechanism is connected to the relay means and adapted to transmit the activation signal thereto upon the activation of the vehicle. Finally, a play back device is connected between the control mechanism and the second input of the relay. In use, the play back device is adapted to transmit an audio signal representative of an audible anti-smoking remark upon the receipt of the activation signal.

2 Claims, 1 Drawing Sheet

ര,874,893

RELAY ACTIVATED DEVICE FOR PREVENTING SMOKING IN A VEHICLE

BACKGROUND OF THE INVENTION

1. Field of the Invention

The present invention relates to vehicular audio reminders and more particularly pertains to a new relay activated device for preventing smoking in a vehicle for audibly reminding passengers within the vehicle not to smoke.

2. Description of the Prior Art

The use of vehicular audio reminders is known in the prior art. More specifically, vehicular audio reminders heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicular audio reminders include U.S. Pat. No. 3,947,812; U.S. Pat. No. 5,190,307; U.S. Pat. No. 4,275,274; U.S. Pat. No. 4,881,554; U.S. Pat. No. 4,222,028; and U.S. Pat. No. 3,987,439.

In these respects, the new relay activated device for preventing smoking in a vehicle according to the present invention substantially departs from the conventional concepts and designs of the prior art, and in so doing provides an apparatus primarily developed for the purpose of audibly reminding passengers within the vehicle not to smoke.

SUMMARY OF THE INVENTION

In view of the foregoing disadvantages inherent in the known types of vehicular audio reminders now present in the prior art, the present invention provides a new relay activated device for preventing smoking in a vehicle construction wherein the same can be utilized for audibly reminding passengers within the vehicle not to smoke.

The general purpose of the present invention, which will be described subsequently in greater detail, is to provide a new relay activated device for preventing smoking in a vehicle apparatus and method which has many of the advantages of the vehicular audio reminders mentioned heretofore and many novel features that result in a new relay activated device for preventing smoking in a vehicle which is not anticipated, rendered obvious, suggested, or even implied by any of the prior art vehicular audio reminders, either alone or in any combination thereof.

To attain this, the present invention generally comprises a pair of speakers. Such speakers are connected to an unillustrated conventional stereo system of a vehicle. As is conventional, the speakers are adapted to transmit audio signals upon the receipt thereof. Next provided is a pair of relays each having a first input connected to the stereo system, a second input, and an output connected to the corresponding speaker. During operation, the relays each have an unbiased orientation wherein the speakers are connected to the stereo system via the first inputs. Further, the relays also have a biased orientation only during the receipt of an activation signal wherein the speaker is connected to the second input. Connected to an ignition of the vehicle an RC network. The RC network is adapted for generating the activation signal upon the starting of the vehicle. A one-shot multivibrator is provided having an input connected to the RC network. An output of the one-shot multivibrator is in communication with the relays for transmitting the activation signal thereto for a predetermined amount of time upon at least the instantaneous receipt thereof from the RC network. Finally, a play back device is connected between the one-shot multivibrator and the second input of the relays. In use, the play back device is adapted to transmit an audio signal representative of an audible anti-smoking remark upon the receipt of the activation signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new relay activated device for preventing smoking in a vehicle apparatus and method which has many of the advantages of the vehicular audio reminders mentioned heretofore and many novel features that result in a new relay activated device for preventing smoking in a vehicle which is not anticipated, rendered obvious, suggested, or even implied by any of the prior art vehicular audio reminders, either alone or in any combination thereof.

It is another object of the present invention to provide a new relay activated device for preventing smoking in a vehicle which may be easily and efficiently manufactured and marketed.

It is a further object of the present invention to provide a new relay activated device for preventing smoking in a vehicle which is of a durable and reliable construction.

An even further object of the present invention is to provide a new relay activated device for preventing smoking in a vehicle which is susceptible of a low cost of manufacture with regard to both materials and labor, and which accordingly is then susceptible of low prices of sale to the consuming public, thereby making such relay activated device for preventing smoking in a vehicle economically available to the buying public.

Still yet another object of the present invention is to provide a new relay activated device for preventing smoking in a vehicle which provides in the apparatuses and methods of the prior art some of the advantages thereof, while simultaneously overcoming some of the disadvantages normally associated therewith.

Still another object of the present invention is to provide a new relay activated device for preventing smoking in a vehicle for audibly reminding passengers within the vehicle not to smoke.

Even still another object of the present invention is to provide a new relay activated device for preventing smoking in a vehicle that includes at least one speaker connected to a conventional stereo system of a vehicle. The speaker is adapted to transmit audio signals upon the receipt thereof. Further provided is at least one relay having a first input connected to the stereo system, a second input, and an output connected to the speaker. The relay has an normal first mode wherein the speakers are connected to the stereo system via the first input and a second mode only during the receipt of an activation signal wherein the speaker is connected to the second input. A control mechanism is connected to the relay means and adapted to transmit the activation signal thereto upon the activation of the vehicle. Finally, a play back device is connected between the control mechanism and the second input of the relay. In use, the play back device is adapted to transmit an audio signal representative of an audible anti-smoking remark upon the receipt of the activation signal.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
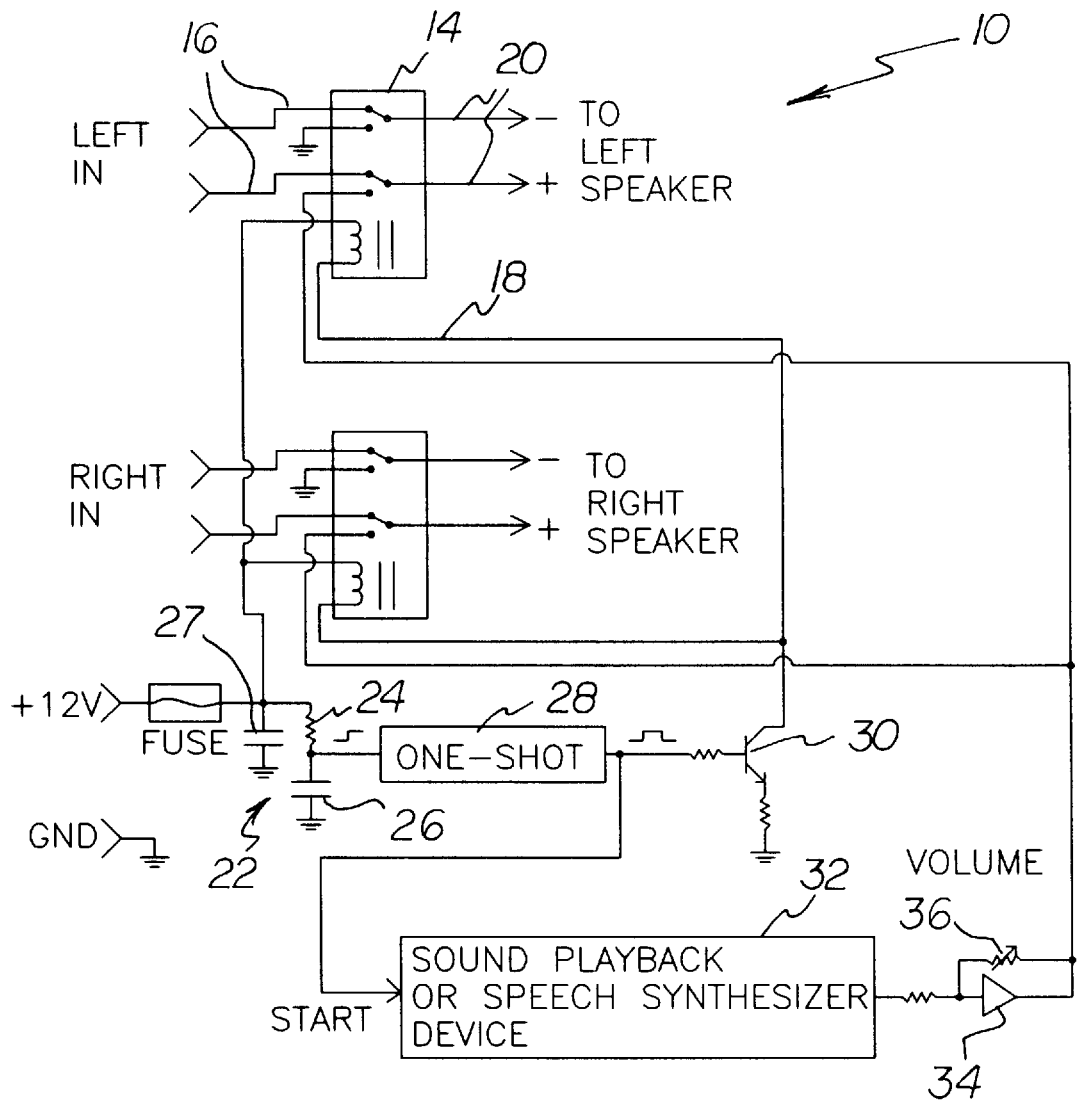
FIG. 1 is a schematic diagram of a new relay activated device for preventing smoking in a vehicle according to the present invention.

With reference now to the drawings, and in particular to FIG. 1 thereof, a new relay activated device for preventing smoking in a vehicle embodying the principles and concepts of the present invention and generally designated by the reference numeral 10 will be described.

As shown in FIG. 1, a pair of speakers is included. Such speakers are connected to an unillustrated conventional stereo system of a vehicle. As is conventional, the speakers are adapted to transmit audio signals upon the receipt thereof.

Next provided is a pair of relays 14 each having a first input 16 connected to the stereo system, a second input 18, and an output 20 connected to the corresponding speaker. During operation, the relays each have an unbiased orientation wherein the speakers are connected to the stereo system via the first input. Further, the relays also have a biased orientation only during the receipt of an activation signal wherein the speaker is connected to the second input. It should be noted that the activation signal is received by a coil of associated with the relays. In the present description, the activation signal constitutes a voltage pulse.

Connected to an ignition of the vehicle an RC network 22. The RC network is adapted for generating the activation signal upon the starting of the vehicle. As shown in the Figure, the RC network includes a resistor 24 connected to the ignition and a capacitor 26 connected thereto with a node defined therebetween. Further, a second capacitor 27 is connected between the ignition and ground. By this structure, the voltage at the node is initially low upon the activation of the vehicle. After a small amount of time, the capacitor 26 is changed and accordingly the voltage at the node is high. As such, a leading edge of a pulse, or activation signal, is afforded at the node.

A one-shot multivibrator 28 is provided having an input connected to the node of the RC network. An output of the one-shot multivibrator is in communication with the relays for transmitting the activation signal thereto for a predetermined amount of time upon at least the instantaneous receipt thereof from the RC network. So that a proper amount of voltage is supplied to the relay coils, an amplifying transistor 30 is connected between the output of the multi-vibrator and the relays. As will become apparent later, the aforementioned predetermined amount of time is preferably the length of a short remark.

Finally, a play back device 32 is connected between the one-shot multivibrator and the transistor. It should be noted that the play back device preferably comprises a magnetic tape or a digital speech synthesizer. In use, the play back device is adapted to transmit an audio signal representative of an audible anti-smoking remark to the speakers via the second input of the relays upon the receipt of the activation signal. Such remark preferably includes the phrase "Please do not smoke in the vehicle", or the like. In order to insure that the audio signal is properly amplified, an operational amplifier 34 is preferably connected between the output of the play back device. Such amplifier further has associated therewith a potentiometer 36 with an associated dial for allowing a user to selectively determine the magnitude of the audio signal.

In use, the present invention allows the automatic transmission of an audible request that passengers do not smoke within a vehicle. As such, the owner of the vehicle need not endure an awkward situation wherein a passenger is asked to put out a cigarette or cigar. Further, the present invention ensures that no one smokes within the vehicle when it is being used by other parties.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular anti-smoking system comprising, in combination:

a pair of speakers connected to a conventional stereo system of a vehicle, the speakers adapted to transmit audio signals upon the receipt thereof;

a pair of relays each having a first input connected to the stereo system, a second input, and an output connected to the corresponding speaker, the relays each having an unbiased orientation wherein the speakers are connected to the stereo system via the first inputs and a biased orientation only during the receipt of an activation signal in the form of a voltage pulse wherein the speaker is connected to the second input;

an RC network connected to an ignition of the vehicle for generating the activation signal upon the starting of the vehicle, the RC network including a first resistor connected to an ignition of the vehicle and a capacitor connected to the first resistor with a node defined therebetween, a second capacitor connected between the ignition and ground, wherein a voltage at the node is initially low upon the activation of the vehicle after which the capacitor is charged and the voltage at the node is high, thereby affording a leading edge of the activation signal at the node;

a one-shot multivibrator having an input connected to the RC network and an output in communication with the relays for transmitting the activation signal thereto for a predetermined amount of time upon at least the instantaneous receipt thereof from the RC network;

a transistor connected between the output of the one-shot multivibrator and the relays for supplying a sufficient amount of voltage to the relays;

a play back device connected between the one-shot multivibrator and the second input of the relays, the play back device adapted to transmit an audio signal representative of an audible anti-smoking remark upon the receipt of the activation signal; and an operational amplifier connected between the play back device and the second input of the relays with a potentiometer connected to the operational amplifier for selectively determining a magnitude of the audio signal.

2. A vehicular anti-smoking system as set forth in claim 1 wherein the audio signal includes the message "Please do not smoke in this car".

* * * * *